United States Patent [19]

Ito et al.

[11] Patent Number: 4,978,378
[45] Date of Patent: Dec. 18, 1990

[54] METHOD FOR PRODUCING GLASS PREFORM FOR OPTICAL FIBER

[75] Inventors: Masumi Ito; Hiroshi Yokota; Toshio Danzuka; Masahiro Takagi, all of Yokohama, Japan

[73] Assignee: Sumitomo Electric Industries, Ltd., Osaka, Japan

[21] Appl. No.: 372,084

[22] Filed: Jun. 28, 1989

[30] Foreign Application Priority Data

Jun. 28, 1988 [JP] Japan ................. 63-159058

[51] Int. Cl.⁵ ........................... C03B 37/012
[52] U.S. Cl. .......................... 65/3.12; 65/18.2; 65/900; 65/32.1
[58] Field of Search .......... 65/3.12, 18.2, 32.1, 65/900

[56] References Cited

U.S. PATENT DOCUMENTS

| 3,806,570 | 4/1974 | Flamenbaum et al. | 65/3.12 |
| 4,149,867 | 4/1979 | Akamatsu et al. | |
| 4,157,906 | 6/1979 | Bailey | 65/3.12 |
| 4,251,251 | 2/1981 | Blankenship | |
| 4,586,943 | 5/1986 | Kyoto et al. | 65/3.12 |

FOREIGN PATENT DOCUMENTS

| 0171537 | 2/1986 | European Pat. Off. | |
| 2938218 | 4/1981 | Fed. Rep. of Germany | |
| 0239336 | 11/1985 | Japan | 65/3.12 |
| 2082568 | 3/1982 | United Kingdom | 65/3.12 |

OTHER PUBLICATIONS

Ikemura et al., "Manufacture of Quartz Glass Performs", Chemical Abstracts, vol. 107, No. 4, Abstract 27346q.
Akira Iino, "Production of Base Material for Optical Fiber", Patent Abstracts of Japan, vol. 11, No. 267, (C-443[2714], Aug. 28, 1987.

Primary Examiner—David L. Lacey
Assistant Examiner—Todd J. Burns
Attorney, Agent, or Firm—Cushman, Darby & Cushman

[57] ABSTRACT

A glass preform for use in the fabrication of an optical fiber having little bubbles is produced by a method comprising depositing glass soot on a periphery of a starting glass rod to form a porous glass preform, heating and sintering the porous glass preform in a helium atmosphere to consolidate the porous glass preform and then heating the sintered glass in an atmosphere containing an inert gas except helium having partial pressure of the inert gas of not lower than 0.8 atm. to obtain a transparent glass preform.

4 Claims, 2 Drawing Sheets

F I G. 3
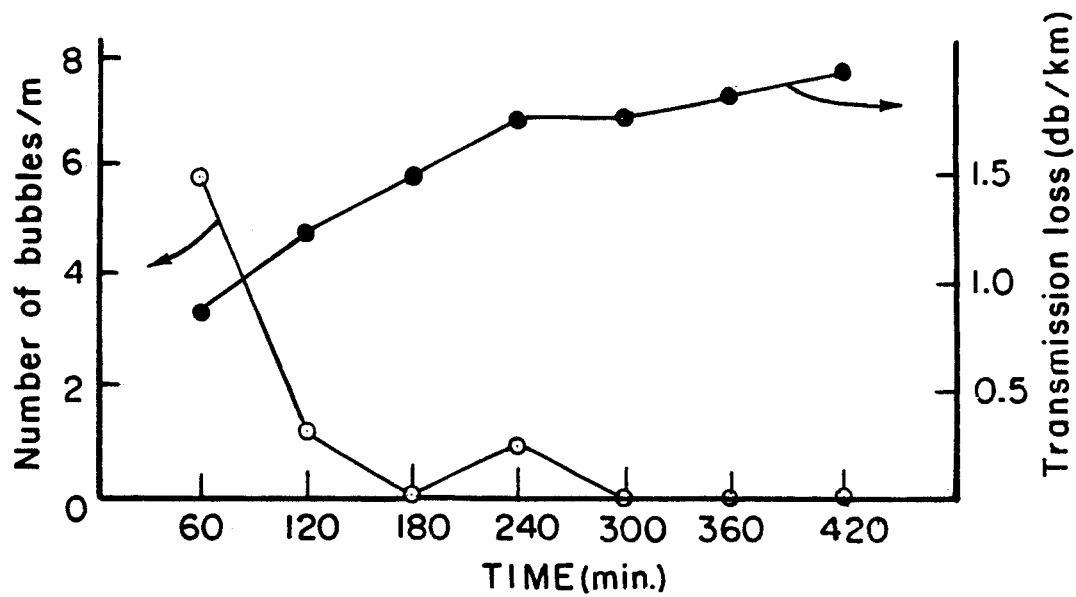

METHOD FOR PRODUCING GLASS PREFORM FOR OPTICAL FIBER

BACKGROUND OF THE INVENTION

1. Field of the Invention

The present invention relates to a method for producing a glass preform for use in the fabrication of an optical fiber.

2. Description of the Related Art

One of the methods for producing a glass preform for use in the fabrication of an optical fiber comprises synthesizing glass soot (fine particles of glass) from a glass-forming raw material by flame hydrolysis, depositing the glass soot on a periphery of a rotating starting glass rod (soot depositing to grow a porous glass body in a direction of an axis of the glass rod to form a composite of the glass rod and the deposited porous glass body and heating and sintering the composite in an electric furnace to consolidate the porous glass body, whereby a transparent glass preform is produced. In the sintering step, it is important to obtain a completely transparent glass preform having no residual bubbles or other defects.

In the sintering step, the fine particles of glass in the porous glass body are fused together so that each void in the glass body is gradually isolated. To obtain the completely transparent glass preform by shrinking and vanishing the isolated bubble, the sintering atmosphere is one of the important factors. When the porous glass body is sintered in an atmosphere of a gas which has a large solubility in glass, the transparent glass is easily obtained. It is known that, in helium, it is easy to obtain the transparent glass having no residual bubble, while in argon or nitrogen, bubbles remain in the sintered glass. Therefore, in general, the porous glass body is sintered in the helium atmosphere.

The glass preform produced by the above method is drawn to fabricate an optical fiber having an outer diameter of 100 to 200 μm. In the drawing step, the glass preform is heated to a temperature of 1,900° C. or higher and drawn, since the glass preform should be processed to a drawable intermediate rod having a suitable diameter for drawing. If the glass preform has defects such as minute crystalline particles or bubbles at an interface between the starting glass rod and the deposited part, such defects grow to generate large bubbles in the glass rod for drawing, which considerably decreases an yield of the glass rod for drawing. For example, when the crystalline particles or bubbles of 0.1 to 0.5 mm in diameter are contained, they grow to bubbles of 1 to 5 mm in diameter. When the glass rod for drawing having such the large bubbles is drawn to fabricate the optical fiber, the optical fiber is easily broken and cannot be continuously fabricated.

SUMMARY OF THE INVENTION

One object of the present invention is to provide a method for producing a glass preform for use in the fabrication of an optical fiber, from which preform, a glass rod for drawing having no bubbles is produced.

Another object of the present invention is to provide a method for producing a glass preform in which a sintering step from a porous glass body to a transparent glass preform is improved.

Accordingly, the present invention provides a method for producing a glass preform for use in the fabrication of an optical fiber, which method comprises depositing glass soot on a periphery of a starting glass rod to from a porous glass preform, heating and sintering the porous glass preform in a helium atmosphere to consolidate the porous glass preform and then heating the sintered glass in an atmosphere containing an inert gas except helium having partial pressure of the inert gas of not lower than 0.8 atm. to obtain a transparent glass preform.

Preferably, in the atmosphere having the partial pressure of inert gas of not lower than 0.8 atm., the glass preform is heated at a temperature of 800 to 1,000° C. for 120 to 360 minutes.

BRIEF DESCRIPTION OF THE DRAWINGS

FIGS. 1, 2 and 3 show the number of the bubbles in the glass rods for drawing which were heated in the nitrogen atmosphere under partial pressure of 0.8 atm. at 800° C., 600° C. and 1,200° C., respectively and transmission loss due to the OH groups in the fabicated optical fibers in Example 2.

DETAILED DESCRIPTION OF THE DRAWINGS

Figure 1:
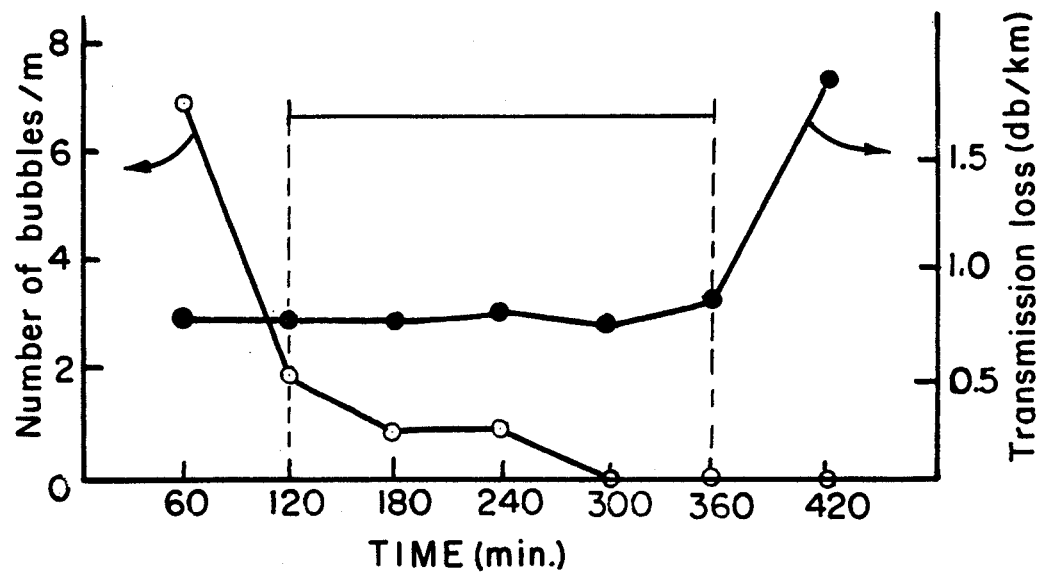

In the method of the present invention, the deposition of the glass soot and sintering of the porous glass preform for consolidation can be carried out in conventional manners. That is, the glass soot is synthesized by supplying a glass-forming raw material (e.g. SiCl$_4$, etc.) and a fuel gas (e.g. hydrogen gas, methane gas, etc.) and oxygen gas to a burner for synthesizing the glass soot and flame hydrolyzing the glass-forming raw material in the flame. The synthesized glass soot is deposited on the periphery of the rotating starting glass rod to form a composite of the glass rod and the deposited porous glass body. The composite is heated and sintered in a furnance in the helium atmosphere at a temperature of 1,500° to 1,650° C. to consolidate the composite. For producing the transparent glass preform, any conventional method can be used. Further, the glass preform having any glass composition can be treated by the present invention.

Then, the sintered glass preform is further heated according to the present invention in the inert gas atmophere except helium having partial pressure of the inert gas of not lower than 0.8 atm. preferably at a temperature of 800° to 1,000° C. for 120 to 360 minutes. By this treatment, the growth of the defects in the subsequent drawing is prevented and the glass rod for drawing having good quality is produced in a high yield.

The atmosphere in which the sintered glass preform is further heated may contain other gas insofar as the partial pressure of the inert gas except helium is not lower than 0.8 atm. For example, air containing nitrogen of partial pressure of 0.8 or higher may be used.

When the porous glass preform is sintered in the helium atmosphere and intermediately drawn according to the conventional method, the formed glass rod for drawing contains bubbles of helium. From this fact, it is assumed that helium dissolved in glass during sintering may generate bubbles in the drawn glass preform.

In general, the solubility of a gas in glass decreases as the temperature rises. Then, helium which is dissolved in glass at a lower temperature is changed to a supersaturated state at a high temperature of 1,900° C. during drawing and excess helium forms bubbles in the softened glass.

To prevent such bubble formation, it is effective to decrease a concentration of gas in the glass to a concentration lower than the saturation point. That is, by decreasing the helium concentration through evaporation of helium from the sintered glass, the suppression of bubble forming during drawing is expected.

Based on the above consideration, the present invention is completed.

As the inert gas contained in the atmosphere in which the sintered glass preform is further heated, nitrogen and argon are preferably used. Among them, nitrogen is most preferred since it is the easily available cheapest inert gas and has a small solubility in glass.

Therefore, the following explanation is made by making reference to nitrogen as the inert gas.

Under the partial pressure of nitrogen of not lower than 0.8 atm., helium can be effectively removed even if other gas having a large solubility in glass such as hydrogen or helium is contained in the atmosphere. When pure nitrogen is used, the pressure of nitrogen is preferably 1 atm.

When the sintered glass preform is heated in such atmosphere at a temperature lower than 800° C., helium is not effectively removed since a diffusion rate of helium is small. When the heating temperature exceeds 1,000° C., an innegligible amount of OH groups present at the interface between the starting glass rod and the synthesized glass migrates into the starting glass rod. The OH groups are formed during flame polishing of the starting glass rod to remove dusts and impurities from the surface of the starting glass rod. Since the OH group has an absorption band at a wavelength of 1.38 $\mu$m which is close to the wavelength of 1.3 $\mu$m or 1.55 $\mu$m which is used for optical transmission through the optical fiber, the migration of the OH groups in the starting glass rod which forms a core of the optical fiber will deteriorate transmission loss charateristics of the optical fiber.

The heating time is determined based on the same grounds as above. In the heating time shorter than 120 minutes, helium is not sufficiently removed. In the heating time longer than 360 minutes, the helium removing effect reaches maximum and the migrated amount of the OH groups into the starting glass rod is innegligible.

PREFERRED EMBODIMENT OF THE INVENTION

The present invention will be illustrated by following Examples.

EXAMPLE 1

As a starting glass rod, used was a glass rod consisting of a core portion of $GeO_2$-added $SiO_2$ (specific refractive index difference of 0.3%) with a step type refractive index profile and a cladding portion of pure $SiO_2$ surrounding the core portion. The core portion had a diameter of 4.0 mm and the cladding portion had an outer diameter of 16.0 mm.

Around the starting glass rod, glass ($SiO_2$) soot synthesized by the flame hydrolysis of $SiCl_4$ was deposited to form a porous preform having an outer diameter of 150 mm and a length of 700 mm. Then, the porous preform was inserted with rotation in a heating furnace having a pure helium atmosphere kept at 1,600° C. and to obtain a sintered body having an outer diameter of 70 mm and a length of 400 mm. Visual inspection of the sintered body revealed some defects of 0.1 mm in size which might be minute bubbles.

The sintered body was then heated in a furnace having an atmosphere containing nitrogen under partial pressure of 0.8 atm. at 900° C. for 180 minutes and then drawn at 2,000° C. in a period of about 30 minutes.

The produced glass rod for drawing has no bubbles having a diameter of 1 mm or larger.

COMPARATIVE EXAMPLE

In the same manner as in Example 1, a sintered glass body having the defects in the same degree was produced. Then, the sintered body was drawn in the same manner as in Example 1 without heating it in the nitrogen atmosphere. The glass rod for drawing contained eight bubbles of 1 to 2 mm in diameter per meter of the rod.

EXAMPLE 2

In the same manner as in Example 1, a sintered glass body was produced.

By varying the heating conditions, the sintered body was heated and the number of the bubbles found in the glass rod for drawing was counted. Then, the glass rod was drawn to fabricate an optical fiber, and transmission loss due to the OH groups at a wavelength of 1.38 $\mu$m was examined.

FIG. 1 shows the number of the bubbles in the glass rod for drawing which was heated in the nitrogen atmosphere under partial pressure of 0.8 atm. at 800° C. and transmission loss due to the OH groups in the optical fiber fabricated from said glass rod. Under these conditions, seven bubbles were found per meter of the glass rod at a heating time of 60 minutes, and the transmission loss due to the OH groups increased at a heating time of 420 minutes. At a heating time of 120 to 360 minutes, the number of the bubbles was small and the transmission loss due to the OH groups was decreased.

In the temperature range of 800° to 1,000° C., the same results as FIG. 1 are obtained.

Figure 2:
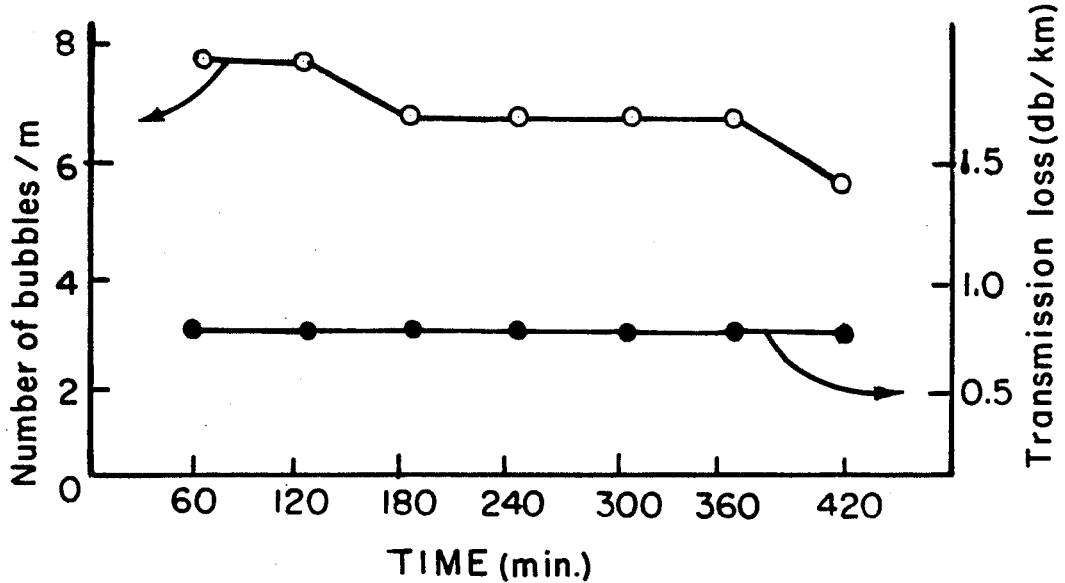

FIG. 2 shows the number of the bubbles in the glass rod for drawing which was heated in the nitrogen atmosphere under partial pressure of 0.8 atm. at 600° C. and transmission loss due to the OH groups in the optical fiber fabricated from said glass rod. At such low temperature, no effect was achieved even after 420 minutes heating.

FIG. 3 shows the number of the bubbles in the glass rod for drawing which is heated in the nitrogen atmosphere under partial pressure of 0.8 atm. at 1,200° C. and transmission loss due to the OH groups in the optical fiber fabricated from said glass rod. At such high temperature, the transmission loss due to the OH groups increased.

What is claimed is:

1. A method for producing a glass preform for use in the fabrication of an optical fiber, which method comprises steps of:
   depositing glass soot on a periphery of a starting glass rod to form a porous glass preform;
   heating and sintering the porous glass preform in a helium atmosphere to consolidate the porous glass preform; and
   heating the sintered glass preform in an atmosphere containing an inert gas except helium having partial pressure of the inert gas of not lower than 0.8 atm under a total pressure of one atm said sintered glass preform heating taking place at a temperature of 800° to 1000° C. for 120 to 360 minutes to obtain a transparent glass preform.

2. The method according to claim 1, wherein the inert gas other than helium is nitrogen.

3. The method according to claim 1, wherein the starting glass rod consists of a core portion and a cladding portion.

4. The method according to claim 1, wherein the partial pressure of the inert gas other than helium is not higher than 1 atm.

* * * * *